United States Patent [19]

Grapes et al.

[11] 4,171,531
[45] Oct. 16, 1979

[54] DEVICE FOR CENTERING AND DRIVING FLEXIBLE DISCS

[75] Inventors: Robert D. Grapes, Oklahoma City; Donald J. Watson, Bethany, both of Okla.

[73] Assignee: Magnetic Peripherals Inc., Minneapolis, Minn.

[21] Appl. No.: 849,924

[22] Filed: Nov. 9, 1977

[51] Int. Cl.² .............................................. G11B 25/04
[52] U.S. Cl. .......................................... 360/99; 360/97
[58] Field of Search ..................................... 360/97–99, 360/135, 133, 105; 274/40

[56] References Cited

U.S. PATENT DOCUMENTS

| | | | |
|---|---|---|---|
| 3,678,481 | 7/1972 | Dalziel et al. | 360/99 |
| 3,898,814 | 8/1975 | Chou et al. | 360/99 X |
| 3,913,137 | 10/1975 | Morgan | 360/105 X |
| 3,968,972 | 7/1976 | Morgan | 274/40 X |
| 3,990,111 | 11/1976 | Elliott | 360/99 |

OTHER PUBLICATIONS
IBM/TDB, vol. 19, No. 6, Nov. 1976, "Collet Mechanism . . ." by Lightner.

Primary Examiner—John H. Wolff
Attorney, Agent, or Firm—Frederick W. Niebuhr

[57] ABSTRACT

An apparatus for centering and driving a flexible disc includes a rotatable spindle and a cone which is insertable through a drive hole in the disc and then into an opening in the spindle whereby the disc is contained between the cone and spindle. A plurality of upstanding centering fingers are mounted in the spindle, extended to the threshold of the spindle opening and equally spaced from the spindle center. The fingers engage the cone as it enters the opening and bend elastically responsive to further cone movement into the opening. The fingers, when so bent, urge the cone toward a centered relation with the spindle. The fingers are adapted to engage any unsupported portion of the disc positioned over the spindle opening, and to support such portion against bending responsive to contact with the moving cone.

11 Claims, 9 Drawing Figures

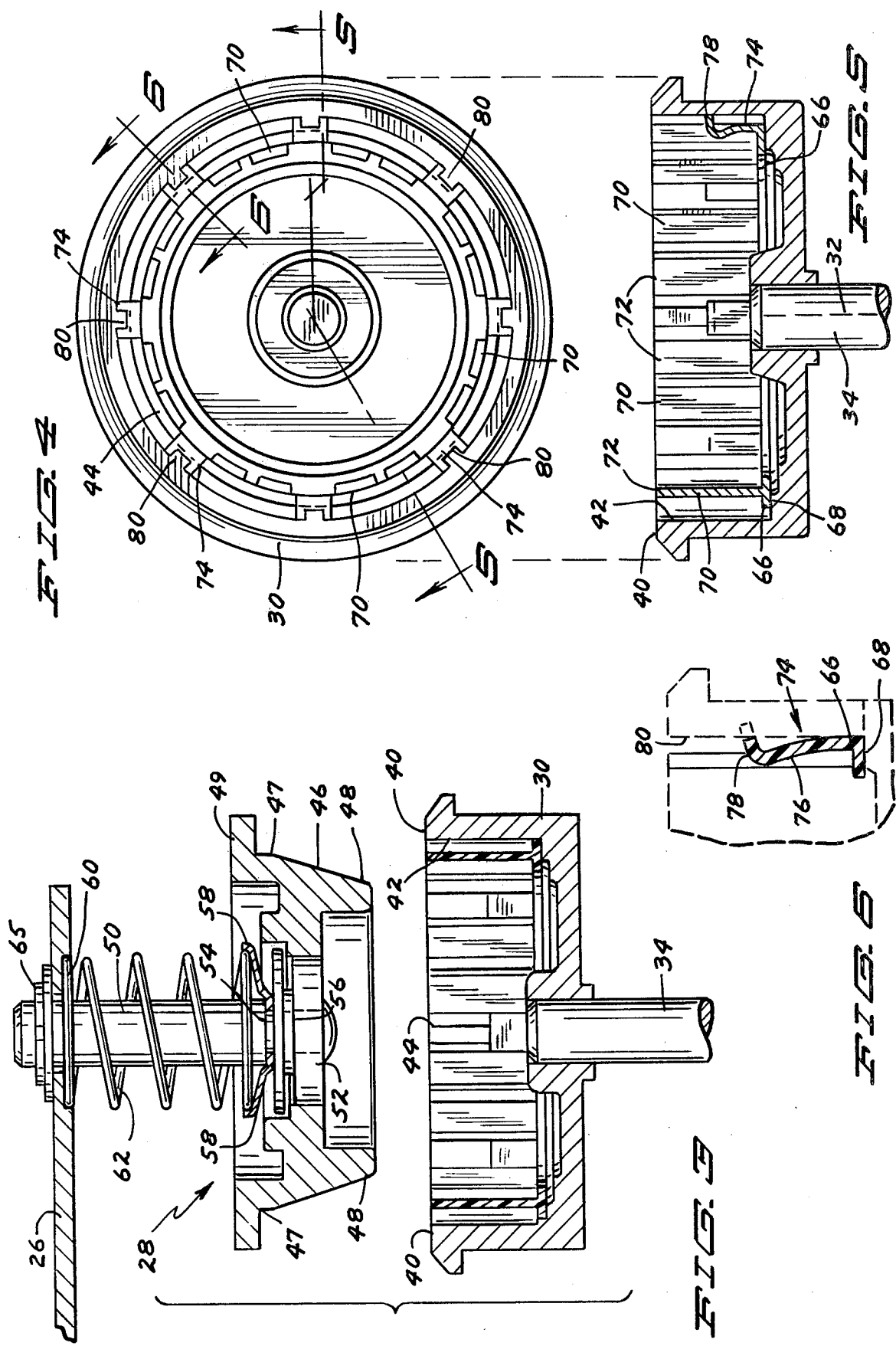

DEVICE FOR CENTERING AND DRIVING FLEXIBLE DISCS

BACKGROUND OF THE INVENTION

The accurate centering of a flexible disc with respect to a driving spindle is required for satisfactory operation of a disc drive mechanism. One known method for centering the disc includes use of a rotating spindle capable of supporting the disc by gravity, and an upwardly diverging clamping cone insertable into an opening provided in the top surface of the spindle. A flexible disc, enclosed in a jacket, is positioned between the cone and spindle in accordance with the outside dimensions of the jacket. Due to tolerances between the jacket and the platform adapted to receive it, the jacket and disc are often not axially aligned with the spindle. A second and more serious cause of misalignment is flotation, or slippage of the disc within its jacket.

To center the disc, an opening is provided in the spindle extended downwardly from the top and of equal size to a drive hole provided in the disc. A clamping cone, mounted above the spindle, has a bottom diameter substantially smaller than that of the drive hole and diverges upward to a diameter substantially equal to that of the drive hole. As the cone is inserted downwardly through the drive hole and into the spindle opening, a portion of its inclined surface engages the innermost portion of the off-center disc. Continued descent of the cone causes the disc to slide, moving the innermost rim of the disk radially outward from the spindle center. When the cone is fully inserted into the spindle opening, the drive hole is aligned with the spindle opening so that the disc is centered.

One problem of such a centering method is that the descending cone can permanently bend the inner rim of the disc adjacent the drive hole. Bending occurs whenever friction between the disc and jacket inhibits sliding of the disc responsive to pressure from the cone. The minutely thin disc is extremely susceptible to such bending. Once permanently bent, the disc cannot be accurately centered. A further problem occurs if the spindle and disc are rotating as the non-rotating cone descends. As the cone first engages the disc and spindle, slippage between the disc and spindle and between the disc and cone causes scuffing and other damage to the disc rim. This can enlarge the drive hole and cause off-center revolution of the disc, making data difficult to read. A sufficiently off-center disc could rub against a portion of the jacket, wrinkling or tearing the same and possibly jamming the drive apparatus and causing loss of data.

SUMMARY OF THE INVENTION

The invention relates to means for centering a disc with respect to its supporting spindle resulting in improved centering accuracy, reduced wear upon the disc and elimination of bending damage to the disc rim.

A flexible disc is typically plastic such as Mylar polyester film, and has a diameter of approximately 20 cm with a thickness of approximately 0.08 mm. At the center of the disc is a circular drive hole. Adjacent to and surrounding the drive hole is an inner rim of the disc.

A spindle, rotatable on a drive axis, is provided for supporting the flexible disc. The spindle has a generally planar disc supporting surface, and an opening in the spindle which, as shown, can be circular and substantially the same size as the drive hole provided in the disc. The spindle opening originates at the disc supporting surface and extends into the spindle. A clamping member, shown mounted directly above the spindle, includes a truncated cone having a first end diameter substantially equal to the drive hole diameter and converging toward the spindle to a second end diameter substantially less than the drive hole diameter. An annular flange extends outward from the first end of the cone. With the cone fully inserted into the spindle opening, the flange bears against the upper surface of the disc to hold it firmly against the disc supporting surface of the spindle.

The clamping member can be mounted rotatably to an overhead supporting arm as shown, by which it is movable vertically toward and away from the spindle. A compression spring between the supporting member and the clamping member urges the clamping member downward toward the spindle. After the cone is substantially inserted into the opening, further lowering of the supporting arm compresses the spring and increases the force securing the disc between the clamping member and spindle.

Mounted in the spindle opening is a guide means adapted to circumferentially engage the inclined surface of the clamping member during its movement toward the spindle. Further cone movement causes the guide means to elastically deform. The guide means, when so deformed, tends to draw the cone into axial alignment with a spindle. Should the cone be initially off-center, that part of the cone the most radially outward causes proportionally greater bending in the guide means and therefore is the most strongly urged toward the drive axis.

The guide means shown is a finger cup having an annular base at the bottom of the spindle opening and a plurality of upstanding fingers. Each finger is mounted at one end to the base and extends vertically upward, terminating in the plane of the disc support surface. The fingers are adapted to support any portion of the flexible disc which is nearer to the drive axis than the edge of the spindle opening and therefore not supported by the disc supporting surface. Any fingers located beneath such unsupported rim portion prevent it from bending in response to contact with the cone as it is moved toward the spindle. Due to the length of the fingers relative to the amount of bending, the effective length of a deflected finger is virtually the same as the length of an undeflected finger. Thus, deflected fingers effectively support the rim portion.

In the majority of cases, the cone contacts and deflects the fingers prior to contacting the disc. The finger cup is mounted to the spindle and rotates with the spindle. Consequently, should the spindle and disc be rotating as the cone is moved toward them, engagement of the cone with the fingers imparts the rotation of the spindle to the cone. It follows that the cone is rotating with the spindle prior to contact with the disc. As rotation is translated to the cone through the fingers rather than through the disc, disc wear due to scuffing from the cone is substantially eliminated.

Thus, in addition to centering the clamping member with respect to the spindle, the finger cup significantly reduces wear and damage to the disc. It imparts rotational motion to the cone before substantial contact with the disc to significantly reduce abrasion and wear. Moreover, by supporting the rim as the cone moves the disk, the finger cup protects the rim from bending and reduces friction in the sliding of the disc to its properly centered position.

In the drawings:

FIG. 3 is an enlarged view of part of FIG. 2 showing a clamping member of the drive mechanism in an open position;

FIG. 4 is a sectional view taken along the line 4—4 in FIG. 2 but with the clamping member and disc removed;

FIG. 5 is a sectional view taken along the line 5—5 in FIG. 4;

FIG. 6 is an enlarged sectional view taken along the line 6—6 in FIG. 4 showing a bracket of the flexible guide;

DETAILED DESCRIPTION OF THE PREFERRED EMBODIMENT

Figure 1:
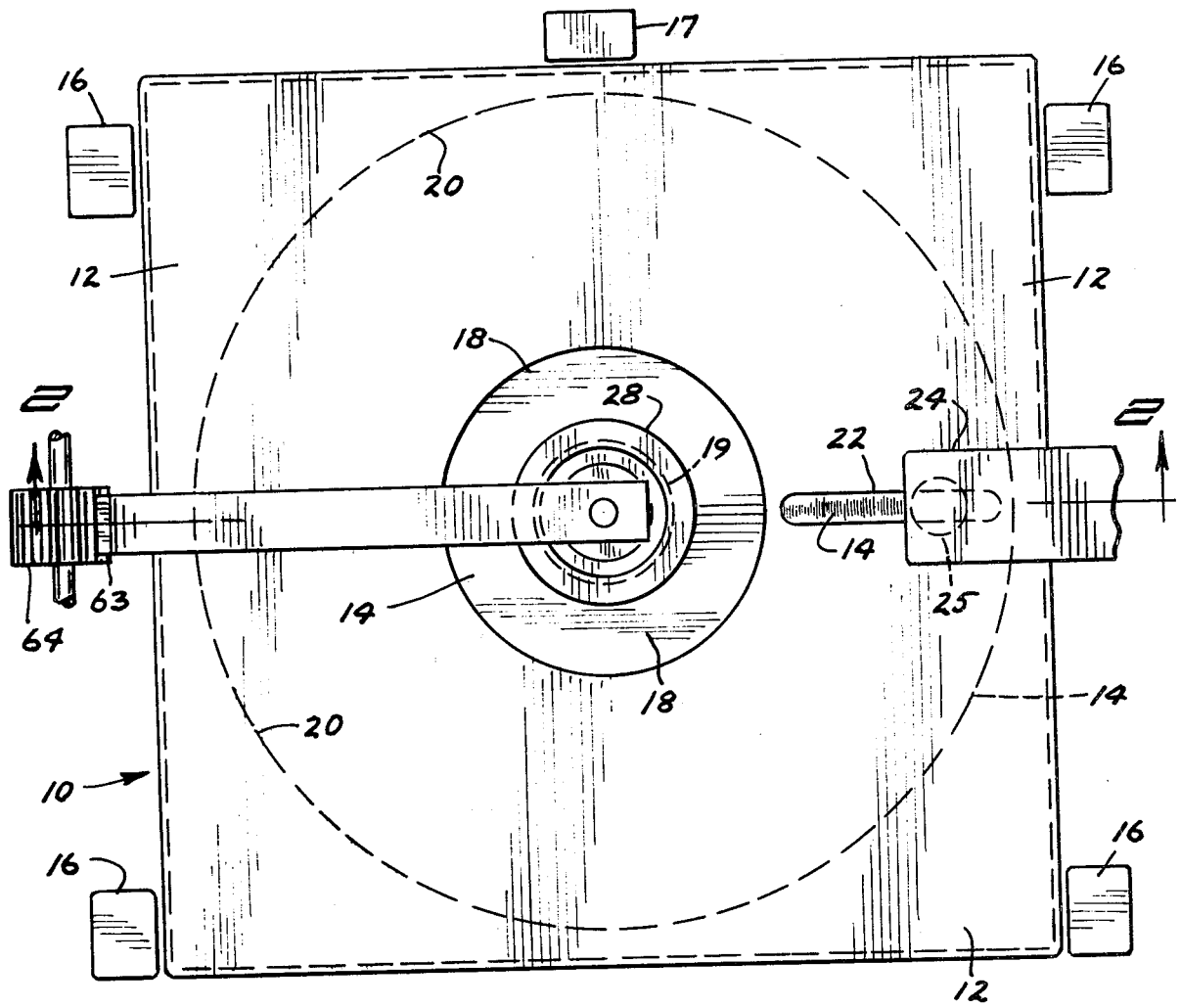
FIG. 1 is a top view of a disc drive mechanism provided with a flexible guide in accordance with the invention, with a disc and jacket mounted thereon.
Figure 2:
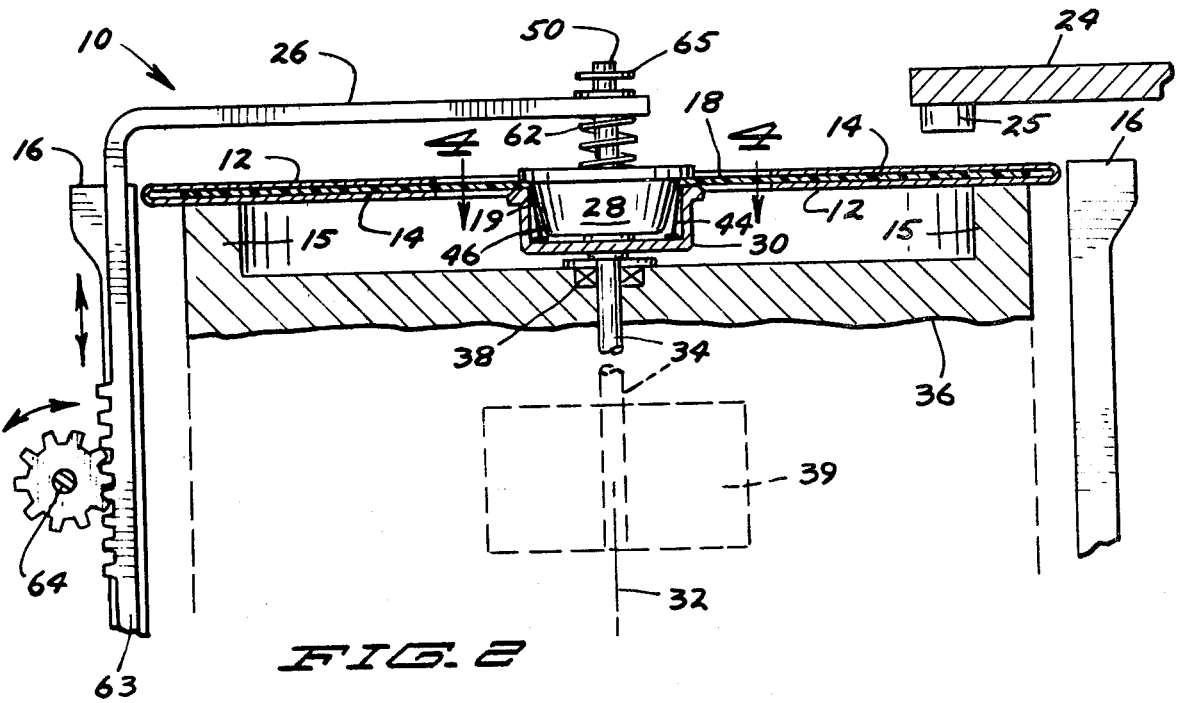
FIG. 2 is a sectional view taken along the line 2—2 in FIG. 1.

Referring to the drawings, FIGS. 1 and 2 show a disc drive mechanism 10 upon which is mounted a cartridge including a jacket 12 and a "floppy" or flexible disc 14 encased therein. Disc 14 is preferably a plastic such as Mylar polyester film, with a diameter of approximately 20 cm and a thickness of approximately 0.003 inches (0.08 mm). Because of its minute thickness, disc 14 is not self-supporting. Jacket 12, of stiff paper, supports the disc in its horizontal configuration. Peripheral support for jacket 12 is provided by risers at 15. A plurality of goal posts 16 and a back stop 17 limit the positioning of jacket 12. Disk 14 has an inner rim 18 adjacent a drive hole 19. The drive hole is at the disk center and has a diameter of 1.5 inches (3.8 cm). A perimeter of disc 14 is shown by broken lines at 20. An elongated slot 22 is provided in the jacekt. A head support 24, shown in part, is movable longitudinally to selectively position a read/write head 25 over slot 22. Opposite head support 24 is a supporting arm 26. A clamping member 28 is mounted with respect to the supporting arm.

Referring to FIG. 2, a drive spindle 30 in mechanism 10 is symmetrical about a vertical drive axis 32. Spindle 30 is preferably aluminum, and is supported on a stainless steel drive shaft 34 press fit into the spindle. Drive shaft 34 is mounted rotatably with respect to a base 36 through a flanged bearing 38. A drive means, for example an electric motor 39, rotates shaft 34 and therefore spindle 30 counterclockwise about drive axis 32 as viewed in FIG. 1.

As seen in FIG. 3, spindle 30 has a flat and horizontal top surface 40 which provides a disc support surface upon which disc 14 is placed. Centered in top surface 40 is a generally circular opening 42 extended vertically downward into the spindle, giving spindle 30 the general appearance of a cup. The diameter of opening 42 is equal to or just slightly larger than the diameter of drive hole 19. The opening is sufficiently large so that clamping member 28 can be inserted therein as shown in FIG. 2. Mounted to spindle 30 inside opening 42 is a flexible guide comprising a finger cup 44 which is deflected radially outward from the drive axis when clamping member 28 is fully inserted.

Clamping member 28 is supported by arm 26 in generally centered relation to drive axis 32. Member 28 includes a truncated cone 46 converging downwardly and inwardly toward spindle 30. Cone 46 includes an upper end 47 having a diameter equal to or slightly less than the diameter of drive hole 19, and a lower end 48 of a substantially smaller diameter, for example 1.25 inches (3.2 cm). Between ends 47 and 48 is a uniformly tapered surface. Joined to cone 46 at the upper end is a flange 49 directed radially outward of the drive axis. Flange 49 is adapted to engage rim 18 of disc 14, holding it firmly against top surface 40.

Clamping member 28 is rotatably mounted to an elongated clamping shaft 50 through a bearing 52 inserted onto the shaft below a shoulder 54. A plug 56, secured on shaft 50, supports bearing 52. An annular retainer 58 is positioned on shaft 50 between shoulder 54 and bearing 52. Retainer 58 and a groove 60 in arm 26 support a coil spring 62, maintaining the spring in compression. Spring 62 biases clamping member 28 away from the supporting arm toward spindle 30.

The upper end of shaft 50 extends through an oversized hole in arm 26. A rack 63 integral with arm 26, and a pinion 64 rotatable in either direction to selectively raise and lower rack 63, illustrate a means for selectively raising and lowering arm 26. Alternate arrangements, for example involving a cam or worm gear, could be employed. In a closed position, shown in FIG. 2, cone 46 is completely inserted into opening 42. In an open position, seen in FIG. 3, clamping member 28 is remote from spindle 30 in the sense that lower end 48 of the cone is substantially above the plane of top surface 40. With clamping member 28 completely free of the spindle, a snap ring 65, larger than the oversized hole in supporting arm 26, retains shaft 50 against downward movement responsive to the biasing force of spring 62. In FIG. 2, it is seen that in the closed position, the snap ring is above arm 26 and downward shaft movement is counteracted by clamping member 28 abutting spindle 30. The spring biasing action thus firmly secures disk 14 between flange 49 and top surface 40.

Finger cup 44 and spindle 30 are shown in greater detail in FIGS. 4 through 6. The preferred flexible guide is a unitary finger cup 44 of resilient homogenous material, for example, a plastic. The finger cup includes an annular base 66 positionable upon an annular shelf 68 in the spindle opening. Attached to base 66 are a series of elongated flexible fingers 70, arranged peripherally and parallel to drive axis 32 and equidistant therefrom. Each finger has a free upper end 72 coplanar with top surface 40. A configuration in which each finger is approximately 1.4 cm long, 0.4 cm wide and 0.8 mm in thickness has been found satisfactory. Each finger is positioned so that its thickness, i.e. the least dimension, is along a horizontal radial line originating at the drive axis. Eight brackets 74 also are mounted to base 66, arranged symetrically around axis 32 and interstitially among the fingers. Each bracket 74 includes an upright portion 76 extending approximately half the length of fingers 70, and a forked end 78 extended radially outward from the upright portion.

Eight upstanding ribs 80, one associated with each bracket 74, are formed in the wall of opening 42 and also arranged symmetrically around axis 32. Prior to insertion of cup 44 into spindle 30, ribs 80 and brackets 74 are aligned. As cup 44 is inserted, each forked end 78 engages its associated rib at the inside face and two sides thereof. Since each forked end 78, with brackets 74 undeflected, is radially outward of the rib inside face, contact with the rib requires that the upstanding portion of the bracket be deflected as shown in FIG. 6. When deflected, the upstanding portion continually urges the forked end against its associated rib, thereby frictionally securing cup 44 against upward movement with respect to spindle 30. The prongs of each forked end engage the associated rib at its sides to prevent rotation of cup 44 relative to spindle 30. Thus, while finger cup 44 can be removed from the spindle for cleaning, inspection and the like, the brackets and ribs prevent relative movement during normal operation.

While clamping member 28 is generally symmetric about the drive axis, final and more accurate centering is accomplished by finger cup 44. Fingers 70 together define an upright circular cylinder centered about drive axis 32. The cylinder has an inside diameter smaller than the drive hole diameter and substantially larger than the diamter of lower end 48, for example, approximately 1.37 inches (3.5 centimeters).

Moving from the open position toward spindle 30, cone 46 readily enters the cylinder by virtue of its relatively small lower end. Continued descent brings the cone to an intermediate position, between the open and closed positions, in which it contacts cup 44 at one or more of fingers 70. A precisely centered cone contacts all fingers simultaneously, but if cone 46 is off-center, it contacts one or more of fingers 70 prior to the remaining fingers. For example, if cone 46 is off-center to the right as viewed in FIG. 2, the fingers on the right are contacted first and deflected first. Each deflected finger 70, being resilient, has a tendency to return to its unstressed configuration and thus a tendency to push cone 46 radially inward. In the example, the deflected fingers urge the cone leftward in FIG. 2 toward the centered position. Cone 46 may deflect all of fingers 70 and yet remain off-center to the right, deflecting fingers on the right a greater distance than fingers on the left. As the fingers are substantially homogenous, the amount of elastic force is proportional to the amount of deflection. Consequently, fingers deflected a greater distance provide more centering force upon the cone, and the net centering force urges cone 46 leftward.

Eventually, cone 46 is moved sufficiently near its closed position so that contact between the cone and finger cup opposes the bias of spring 62. Further descent of support arm 26 causes shaft 50 and snap ring 65 to rise relative to the support arm, freeing the shaft for movement in the oversized hole of arm 26. Thus able to move laterally with respect to drive axis 32, shaft 50 and clamping member 28 are readily centered on the drive axis responsive to the centering force of the fingers.

The maximum horizontal finger deflection, under full insertion of cone 46, is approximately 0.1 cm, seven percent of the 1.4 cm finger length. As a result, there is virtually no reduction in the vertical height of each finger as it is deflected. Vertical height maintenance is important in the support function explained hereinafter.

Figure 7:
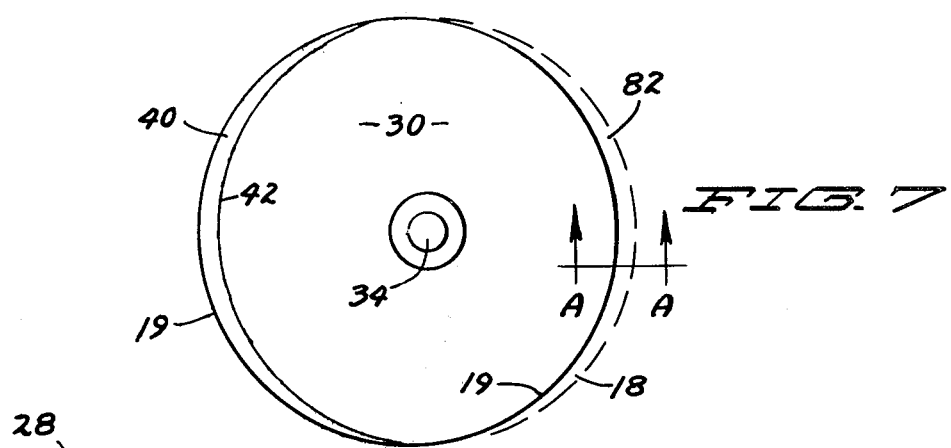
FIG. 7 is a diagrammatic representation of an off-center disc on a spindle of the drive mechanism.
Figure 8:
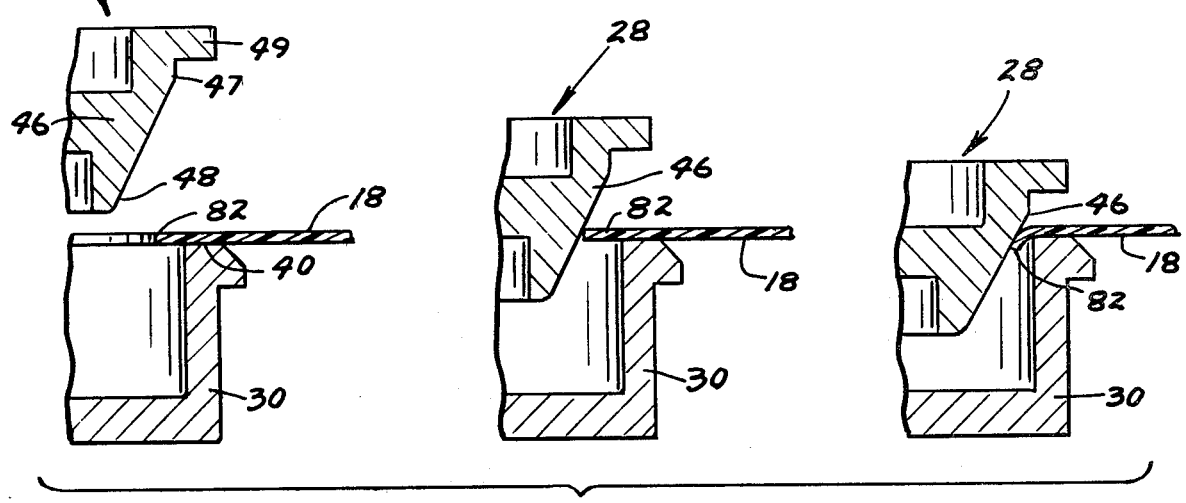
FIG. 8 is a diagrammatic representation of the clamping member progressively inserted into the spindle of the drive mechanism wherein the flexible guide is removed.
Figure 9:
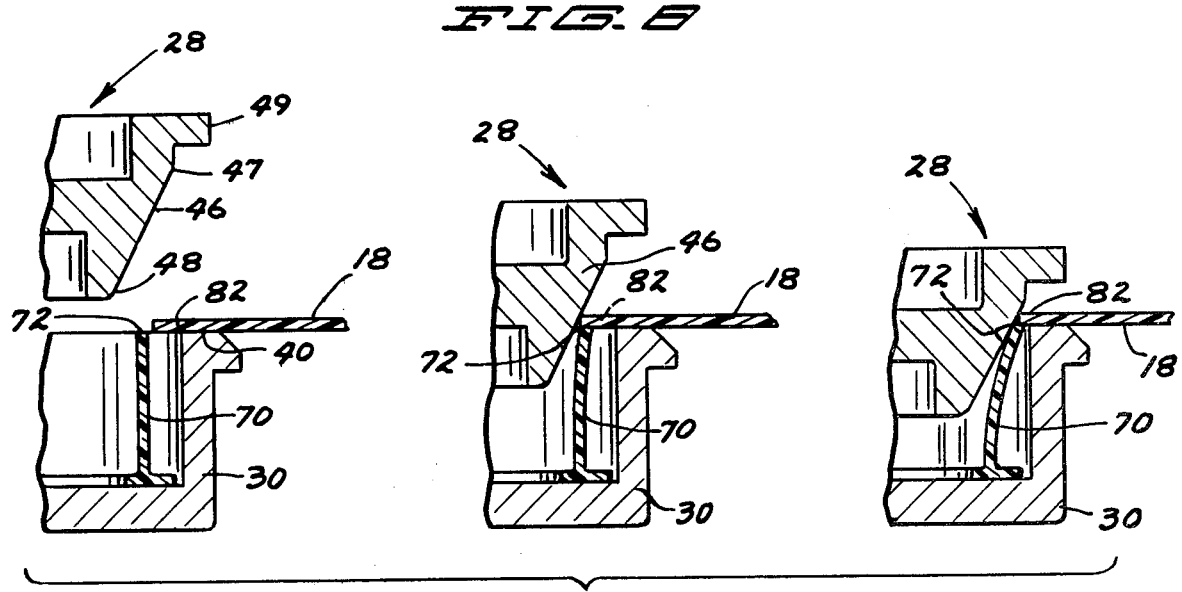
FIG. 9 is a diagrammatic representation of the clamping member progressively inserted into the spindle having the flexible guide mounted therein.

The support function of finger cup 44 is perhaps best understood by a comparison of FIG. 8 with FIG. 9 in view of FIG. 7. FIG. 7 is a diagrammatic representation of flexible disc 14 on spindle 30, but off-center with respect thereto. The perimeter of drive hole 19 and the edge of opening 42 are shown, and a crescent shaped area represents a rim portion 82 of rim 18 which overhangs the spindle opening and is therefore unsupported by flat surface 40. Misalignment of disc 14 upon the spindle occurs due to manufacturing tolerances: between jacket 12 and base 36 of 0.020 inches (0.5 mm) in the vertical and horizontal directions as viewed in FIG. 1; and further for flotation of disc 14 within jacket 12, of 0.060 inches (1.5 mm) in the horizontal and vertical directions of FIG. 1. The maximum linear displacement between the disc hole perimeter and edge of the spindle opening occurs at the center of rim portion 82 and is represented by the line A—A in the diagram. This radial distance can be as great as 0.113 inches (2.9 mm). The tolerances are necessary, however, to allow for variance in jacket size and to insure unimpeded rotation of disc 14 within jacket 12.

Ideally, the error is corrected as the cone is inserted into the spindle opening. As the cone descends, its inclined surface contacts disc 14, initially at rim portion 82. Further movement of the cone toward the spindle is intended to slide disc 14 over flat surface 40 until, when the cone is fully inserted, the disc hole perimeter and edge of opening 42 are aligned, centering the disc on the cone.

In practice, the mechanism can bend the disc as shown in the diagrammatic sequence in FIG. 8. The illustrations in FIG. 8 are equivalent to sectional views taken along the line A—A in FIG. 7. The spindle is without a flexible guide. In the first illustration, clamping member 28 is above the spindle. Upon its downward movement and initial contact with rim portion 82, forces are generated on the rim. The inclined outside surface of cone 46 exerts on the rim a downward force and a horizontal force which has a tendency to slide the disc toward alignment with the spindle. Counteracting the downward force is the support provided by the spindle. This support and the coefficient of friction between the disc and spindle determine the frictional force which resists sliding movement of the disc. If friction is equal to or greater than the horizontal force from the cone, the disc does not slide responsive to downward movement of the cone. Instead, the disc remains stationary and rim portion 82 bends responsive to further cone movement. This condition is shown in the third illustration of FIG. 8, wherein the disc has been bent responsive to descent of the clamping member. If the yield point of the polyester film is surpassed, the bend is permanent and hampers all future efforts to center the disc.

FIG. 9 differs from FIG. 8 in the provision of cup 44 in spindle 30. Prior to initial contact between cone 46 and rim 18, the cone deflects at least one of fingers 70 sufficiently to position its free end 72 below and against disc 14. As the cone contacts rim 18, forces are generated thereon, including downward and horizontal forces substantially equivalent to those in FIG. 8. Counteracting the downward force are forces due to support of disc 14 by spindle 30 and by finger 70. Friction between the disc and spindle resists the horizontal force.

As seen from FIG. 9, cup 44 prevents bending of rim portion 82 primarily by supporting disc 14 at the inner rim. Beyond this direct support, finger 70 substantially reduces friction as it reduces the support required of spindle 30. This insures that the horizontal cone force is greater than friction, and hence that disc 14 responds to moving cone 46 by sliding rather than bending. Disc centering is further enhanced by any friction between fingers 70 and the disc. Such friction tends to move disc 14 in the direction of each engaged finger as it is deflected radially outward from drive axis 32. Insertion of cone 46 into spindle opening 42, beyond that indicated in the third illustration, results in the closed position shown in FIG. 2.

In the majority of cases, the initial position of disc 14, if in error, will be as in FIG. 9. Occasionally, however, disc 14 may be placed such that a portion of inner rim 18 lies radially inward of one or more undeflected fingers 70. Nonetheless, the support provided by each finger beneath the disc effectively resists bending responsive to the moving cone 46, which slides the disc until none of it remains radially inward of the fingers. Further cone movement slides the disc and bends the fingers as previously described.

Another advantage of finger cup 44 lies in its ability to impart rotational motion to clamping member 28 through frictional engagement therewith. As the clamping member is moved toward spindle 30, fingers 70 engage cone 46 prior to any substantial contact between the cone and disc 14, and in most instances prior to any disc-cone contact whatsoever. Whenever the spindle and disc are rotating, cup 44 also is rotating due to the snap fit between brackets 74 and ribs 80. As cone 46 engages rotating fingers 70, friction between free ends 72 and the tapered surface of cone 46 causes the cone to rotate with the fingers. Consequently, cone 46 is rotating at the rate of disc 14 prior to any substantial contact with the disc, eliminating scuffing and wear caused by relative rotation between the disc and cone.

Thus, finger cup 44 provides an accurate method for centering clamping member 28 and disc 14 on spindle 30. Wear to disc 14 is minimized as fingers 70 prevent bending, reduce friction and can aid in sliding the disc toward its properly centered position. Finally, the cup imparts rotational motion of spindle 30 to clamping member 28 prior to substantial contact with a disc, eliminating the problems associated with relative motion between the clamping member, disc and spindle.

The embodiments of the invention in which an exclusive property or privilege is claimed are defined as follows:

1. An apparatus for centering, on a longitudinal drive axis, a flexible disc having means defining a circular drive hole and an inner rim adjacent the drive hole; said apparatus including:
   a spindle rotatable on said drive axis and having a substantially planar disc support surface normal to said drive axis and means defining in said surface an opening extended inwardly thereof;
   a clamping member including a truncated cone generally centered on said drive axis having a first end with a diameter substantially equal to the diameter of a drive hole in a flexible disc and convergent to a second end nearer said spindle and having a diameter substantially less than said drive hole diameter, the clamping member further including a flange adjacent the cone at said first end and extended radially outward thereof;
   means for selectively locating said clamping member axially of said spindle between an open position remote from the spindle; and a closed position wherein said cone extends through the drive hole and then into said spindle opening, wherein a disc is centered on the cone, and wherein said flange and said disc support surface frictionally engage an inner rim of the disc at opposite sides thereof; and
   flexible guide means mounted within said spindle opening and positioned to engage said cone at an intermediate position between said open and closed positions, said guide means adapted to elastically deform responsive to movement of the cone from said intermediate position toward the closed position and, when so deformed, urge the cone toward axial alignment with the spindle; said guide means including an annular base supported in said spindle opening and substantially centered on the drive axis, and a plurality of alongated fingers each mounted at an inner end to said annular base equidistant from said drive axis and extended toward said clamping member; said fingers having outer ends coplanar with said disc support surface and normally defining a circular cylindrical shape having a diameter less than that of said first end of the cone and substantially larger than the diameter of said second end;
   said guide means further includes a plurality of brackers mounted to the base and extending therefrom, each bracket having a forked end at the free end thereof which extends radially outward from said base; and said spindle includes in said opening a longitudinal rib associated with each bracket;
   each forked portion engaging its associated rib thereby preventing rotation of the guide means relative to said spindle.

2. The apparatus of claim 1 wherein:
   said drive axis is vertically disposed, said clamping member when in the open position is above the top of the spindle, and said disc support surface is adapted to support the disc by gravity.

3. The apparatus of claim 2 wherein:
   said clamping member is rotatable about a vertical axis; and said free ends of the fingers engage the tapered surface of the cone as the cone is moved toward the closed position from the open position, thereby preventing rotation of the clamping member relative to the guide means.

4. The apparatus of claim 2 wherein:
   said fingers elastically deform, responsive to cone movement from said intermediate position toward the closed position, to position the upper end of at least one selected finger beneath and against any rim portion of said inner rim radially inward of said disc support surface whereby each select finger supports said rim portion against downward deflection responsive to contact with the cone as said cone is moved toward the closed position.

5. The apparatus of claim 4 wherein:
   the length of each finger is at least fourteen times the radial distance over which its upper end is movable responsive to deformation of the finger.

6. The apparatus of claim 5 wherein:
   the flexible guide means comprise a unitary plastic finger cup.

7. The apparatus of claim 1 wherein:
   said opening in the spindle and the drive hole are substantially equal in diameter, and aligned with one another when the disc is axially aligned with the spindle;
   said disc, when not so aligned, having a rim portion radially inward of the disc support surface;
   said cone, as it moves from the open position, contacting the disc initially at said rim portion;
   said fingers including at least one selected finger, each selected finger having its outer end against said rim portion to support the same whereby movement of the cone, following its contact with the rim portion, causes the disc to slide toward axial alignment with the cone as the fingers urge the cone toward axial alignment with the spindle.

8. The apparatus of claim 7 wherein:

the cone, as it moves towards closure beyond said intermediate position, deflects the fingers radially outward whereby the outer end of each selected finger is positioned against said rim portion before said cone contacts the rim portion.

9. The apparatus of claim 7 wherein:

each selected finger, prior to its contact with the cone, is positioned against said rim portion.

10. The apparatus of claim 1 wherein:

said guide means is secured against rotation about the drive axis relative to said spindle; said cone is rotatable about an axis parallel to said drive axis; and said outer ends of the fingers engage the tapered surface of the cone as the cone is moved toward the closed position from the open position, thereby preventing rotation of the cone relative to the guide means.

11. The apparatus of claim 1 wherein:

said fingers elastically deform, responsive to cone movement from said intermediate position toward the closed position, to position the outer end of at least one selected finger against any rim portion of said inner rim radially inward of said disc support surface whereby each selected finger supports said rim portion against deflection responsive to contact with the cone as the cone is moved toward the closed position.

* * * * *